(12) United States Patent  
Yamauchi et al.

(10) Patent No.: US 9,252,620 B2  
(45) Date of Patent: Feb. 2, 2016

(54) BATTERY ENERGY STORAGE SYSTEM

(75) Inventors: Shin Yamauchi, Tokyo (JP); Motoo Futami, Tokyo (JP); Kohei Honkura, Tokyo (JP); Hironori Sasaki, Tokyo (JP); Osamu Kubota, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 14/119,241

(22) PCT Filed: May 24, 2012

(86) PCT No.: PCT/JP2012/063377  
§ 371 (c)(1),  
(2), (4) Date: Nov. 21, 2013

(87) PCT Pub. No.: WO2012/165300  
PCT Pub. Date: Dec. 6, 2012

(65) Prior Publication Data  
US 2014/0111163 A1 Apr. 24, 2014

(30) Foreign Application Priority Data  
May 31, 2011 (JP) ................................. 2011-121223

(51) Int. Cl.  
*H02J 7/00* (2006.01)  
*H01M 10/44* (2006.01)  
*H01M 10/48* (2006.01)  
*H02J 3/32* (2006.01)

(52) U.S. Cl.  
CPC ........... *H02J 7/0068* (2013.01); *H01M 10/441* (2013.01); *H01M 10/482* (2013.01); *H02J 3/32* (2013.01); *H02J 7/0013* (2013.01); *Y02E 40/10* (2013.01)

(58) Field of Classification Search  
CPC .... H02J 7/0068; H02J 2007/0059; H02J 3/32  
USPC .................................................. 320/128, 134  
See application file for complete search history.

(56) References Cited

U.S. PATENT DOCUMENTS 5,663,628 A * 9/1997 Fujii .............................. 362/183  
6,081,099 A * 6/2000 Shimoda ....................... 320/134  
(Continued)

FOREIGN PATENT DOCUMENTS

JP  2004-147477 A  5/2004  
JP  2007-335157 A  12/2007  
(Continued)

OTHER PUBLICATIONS

Corresponding International Search Report with English Translation dated Aug. 14, 2012 (five (5) pages).

*Primary Examiner* — Sun Lin  
(74) *Attorney, Agent, or Firm* — Crowell & Moring LLP (57) ABSTRACT

In order to provide a charge/discharge technology for controlling an assembled battery system without promoting degradation or reduction in the lifetime of the assembled battery system, the assembled battery system includes a function for controlling charge and discharge power of a plurality of units each including a secondary battery and a power converter as one unit, the plurality of units being electrically connected in parallel to each other. When each unit performs charge or discharge by at least one or more times, charge and discharge of the unit are controlled so as not to be performed until a predetermined pause time period elapses.

20 Claims, 13 Drawing Sheets

(56) References Cited

U.S. PATENT DOCUMENTS

| | | | |
|---|---|---|---|
| 6,445,162 B1 * | 9/2002 | Mukainakano | 320/132 |
| 6,770,352 B2 * | 8/2004 | Suzuki et al. | 428/142 |
| 7,772,806 B2 * | 8/2010 | Kitanaka | 320/140 |
| 2007/0284159 A1 | 12/2007 | Takami et al. | |
| 2011/0193516 A1 | 8/2011 | Oohara et al. | |

FOREIGN PATENT DOCUMENTS

| | | |
|---|---|---|
| JP | 2009-261076 A | 11/2009 |
| JP | 2010-11708 A | 1/2010 |
| JP | 2010-29015 A | 2/2010 |
| WO | WO 2011/030380 A1 | 3/2011 |

* cited by examiner

(a) IN CASE OF DISCHARGE

※ VALUE OF PBR IS POSITIVE

(b) IN CASE OF CHARGE

※ VALUE OF PBR IS NAGATIVE

FIG.6

(a) IN CASE OF DISCHARGE (b) IN CASE OF CHARGE

| SOC | OLIVINE ACID-BASED | COBALT OXIDE-BASED | NICKEL COBALT OXIDE-BASED |
|---|---|---|---|
| [%] | [sec] | | |
| 0 | 540 | 480 | 420 |
| 20 | 480 | 420 | 360 |
| 40 | 420 | 360 | 300 |
| 60 | 360 | 300 | 240 |
| 80 | 300 | 240 | 180 |
| 100 | 240 | 180 | 120 |

BATTERY ENERGY STORAGE SYSTEM

TECHNICAL FIELD

The present invention relates to a battery energy storage system used, for example, for suppressing a load variation in a power line.

BACKGROUND ART

Together with introduction of a natural energy power generation apparatus which utilizes natural energy such as wind-power generation and solar power generation into a power line, there is the possibility that the power system associated with the apparatus is adversely affected by frequency variation or voltage variation. As one of countermeasures, a method has been proposed in which a power storage apparatus is provided to a natural energy power generation apparatus to suppress the voltage variation of a power line of the natural energy power generation apparatus. For example, a power storage apparatus for compensating for output variation of a natural energy power generation apparatus is disclosed in Patent Document 1. In the power storage apparatus, an assembled battery system which includes a plurality of series battery units of lithium batteries connected in parallel to each other and a control apparatus is configured. The assembled battery system changes over between charge and discharge in response to output variation of the natural energy generation apparatus. Further, each of the series battery units includes a current control element which is controlled in response to a voltage, a temperature or an internal resistance of the battery unit, or these of a battery cell which constitute the battery unit in order to prevent a dispersion of a voltage among each unit.

PRIOR ART LITERATURE

Patent Document

Patent Document 1: JP-2010-29015-A

SUMMARY OF THE INVENTION

Problems to be Solved by the Invention

However, in the assembled battery system disclosed in Patent Document 1, for example, if some unit has a smaller capacity than the other units, then the current control element is controlled so that the load is concentrated on units which have a larger capacity in order to prevent a voltage difference among the units by charge and discharge. If such a usage as just described continues, degradation of the battery may be accelerated and finally the lifetime of the assembled battery system may be shortened.

A representative invention of the present application provides a battery energy storage system which can achieve elongation of the lifetime.

The representative invention of the present application here provides a battery energy storage system which includes a function of controlling charge and discharge power of a plurality of units. Each of the units includes a capacitor and a power converter as one unit and is electrically connected in parallel mutually. After each unit charges or discharges at least one or more times, performance of charge and discharge for the unit is controlled for certain period of pause time.

Advantage of the Invention

With the representative invention of the present specification, acceleration of decreasing lifetime caused by degradation of capacitors can be suppressed, thus achieving elongation of the lifetime of the battery energy storage system.

MODE FOR CARRYING OUT THE INVENTION

In the following, an embodiment of the present invention is described with reference to the drawings.

Embodiment 1

An embodiment of the present invention is described below with reference to the drawings.

Figure 1:
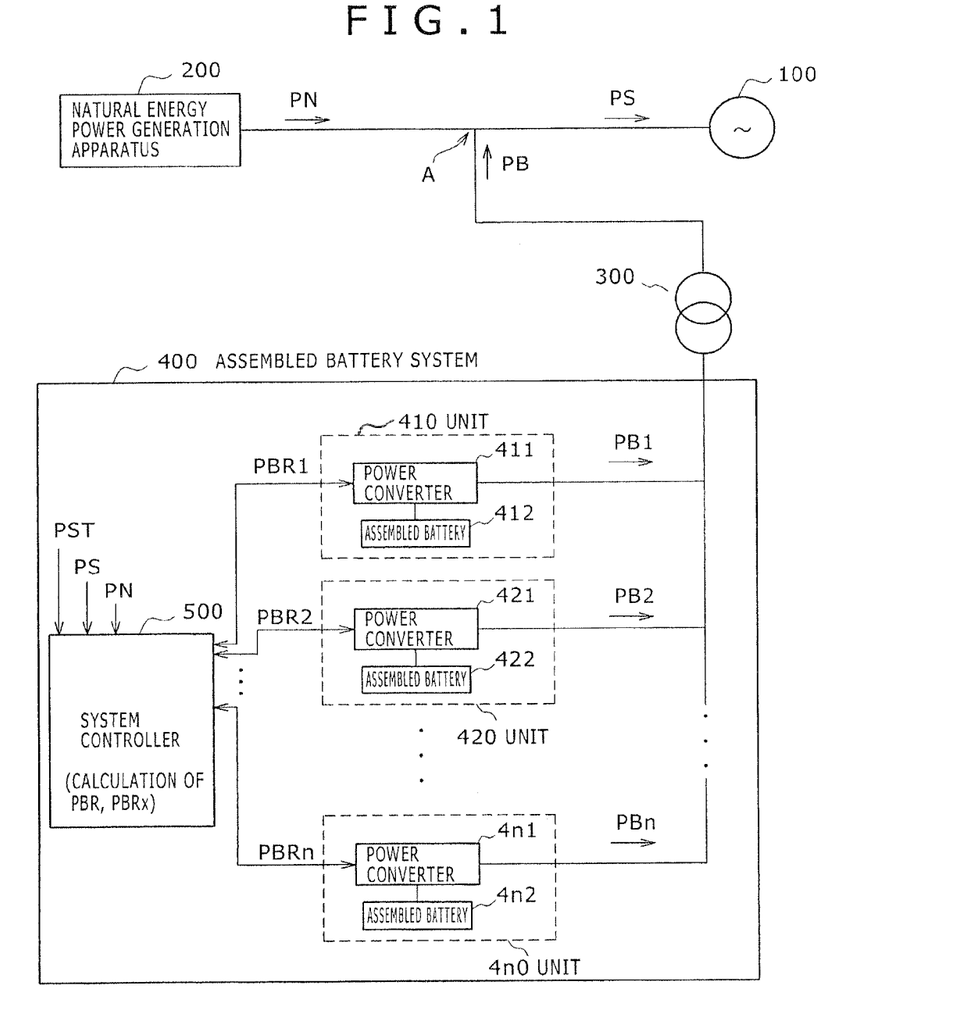
FIG. 1 shows an example of a configuration of an assembled battery system in a present embodiment.

FIG. 1 shows an example of an application of the present invention. An assembled battery system 400 is connected to a power line 100 through a natural energy power generation apparatus 200 and a transformer 300. Output power PN from the natural energy power generation apparatus and output power PB from the assembled battery system 400 merge at an interconnection point A to produce power PS, which is supplied to the power line 100. The assembled battery system includes a plurality of units connected in parallel to each other, and a system controller 500. Each unit includes a power converter 411 and an assembled battery 412 which, the two, form a configuration unit. The assembled battery 412 includes a plurality of lithium battery cells connected in series-parallel to each other. The system controller 500 applies a command value of charge and discharge power to each unit. The system controller calculates power PBR the assembled battery system outputs from the output power PS supplied to the power line 100, output power PN of the natural energy power generation apparatus, and required power PST of the power line. The system controller further calculates a command value PBRx for the charge and discharge power of each unit based on power available to use for charge and discharge by each unit. Each of the units controls the power converter so that the charge and discharge power PBx and the target value PBRx equal.

The configuration of the system controller described above are shown in FIG. 2 in detail.

Figure 2:
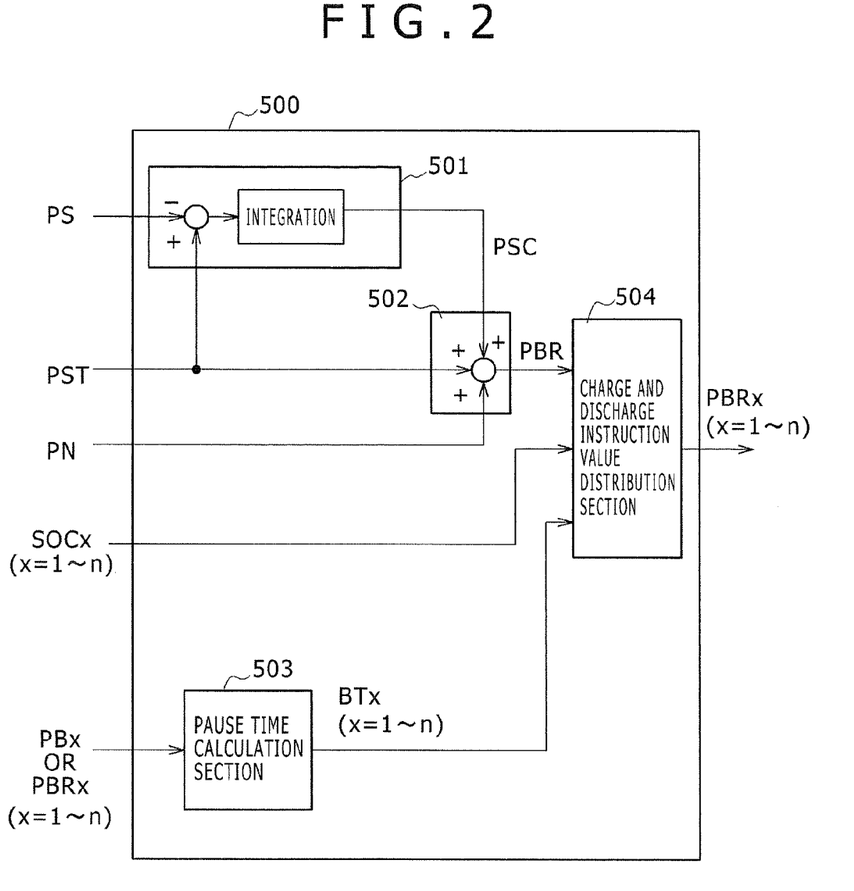
FIG. 2 shows an example of a configuration of a system controller of an assembled battery system.

The system controller 500 is configured from an output correction section 501, charge and discharge power target value calculation section 502, a pause time calculation section 503, and a charge and discharge command value distribution section 504. The output correction section 501 integrates the difference between required power PST of the power line and supplied power PS to calculate a correction value PSC for the output power PB of the assembled battery system 400. The charge and discharge power target value calculation section 502 subtracts the output power PN of the natural energy power generation apparatus 200 from sum of the required power PST of the power line and the correction value PSC to determine target charge and discharge power PBR of the assembled battery system 400. The pause time calculation section 503 calculates a pause time period BTx after charge or discharge of each unit according to the charge and discharge power PBx of the unit, or the instruction value PBRx for the charge or discharge power. The charge and discharge instruction value distribution section 504 calculates the instruction value PBRx to each unit according to the target charge and discharge power PBR, a charge state SOCx (State of Charge) of each unit, and the pause time period BTx. It is to be noted that the SOC is a ratio of amount of charged electricity with respect to a battery capacity.

Further, a calculation method of a pause time period BTx by the pause time calculation section 503 is described with reference to FIGS. 3 and 4.

Figure 3:
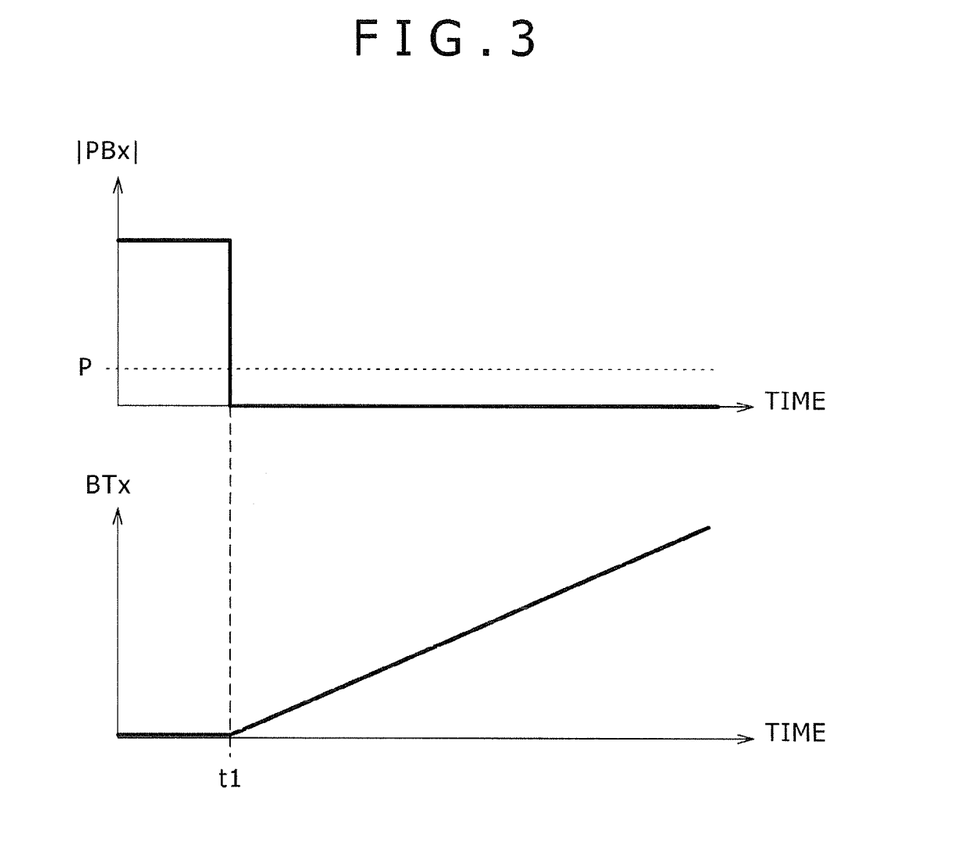
FIG. 3 illustrates an example of a calculation method for a pause time period.

FIG. 3 illustrates a case of calculating the pause time period BTx by using the charge and discharge power PBx. From time t1 at which the absolute value of the charge and discharge power PBx becomes lower than a predetermined value P, a value coincident with time of a control period in the system controller is integrated every control period. The integrated value is determined as the pause time period BTx.

It is to be noted that the predetermined value P is determined by following methods, for example, taking errors by sensors of the power, voltage and current into consideration. In particular, the predetermined value P needs to be sufficiently lower than the maximum output of each unit but be higher than the measurement errors by the sensors. However, the predetermined value may be a sufficiently low value given in advance.

Figure 4:
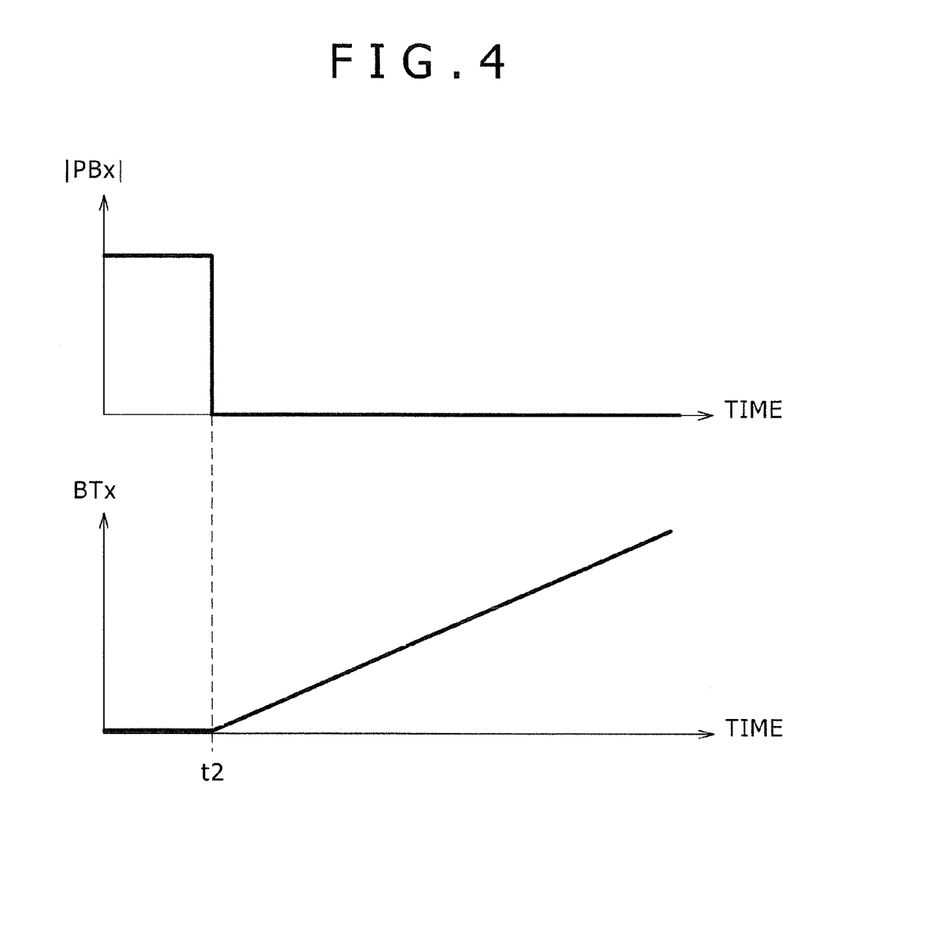
FIG. 4 illustrates another example of the calculation method for a pause time period.

FIG. 4 illustrates a case of calculating a pause time period by using PBRx.

In this instance, a value coincident with a period of time of the control cycle in the system controller 500 every control period is integrated from time t2 at which the instruction value PBRx=0 is satisfied. The integrated value is called BTx.

Operation of the charge and discharge instruction value distribution section 504 is described in detail with reference to FIGS. 5 and 6 as follows.

Figure 5:
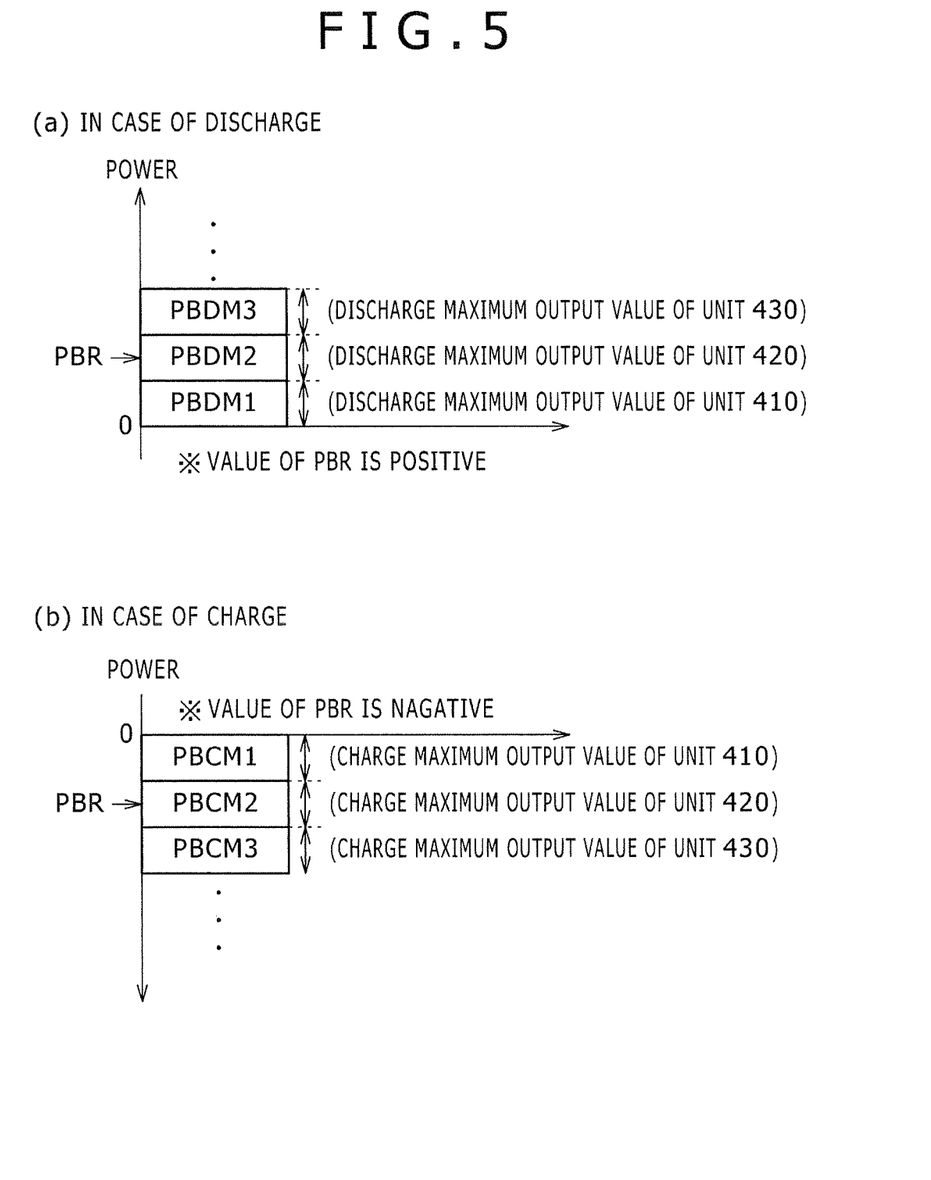
FIG. 5 illustrates an example of a distribution method of charge and discharge outputs, wherein (a) and (b) illustrate an example in the case of discharge, and charge, respectively.

(a) of FIG. 5 illustrates a distribution method of a charge/discharge instruction value in a case of discharge.

The charge/discharge instruction value distribution section distributes a discharge maximum output power PBDM of the units based on SOC information of each unit in the descending order of the SOC.

(a) of FIG. 5 represents the ones of high SOC in the order of the unit 410, unit 420 and unit 430. Accordingly, the priority order is in the same order. As to PBRx in this instance, PBDM1 which is a discharge maximum output value is distributed to the unit 410 while a value obtained by subtracting PBDM1 from the target charge and discharge power PBR is distributed to the unit 420. PBRx to the other unit is zero.

Similarly, (b) of FIG. 5 illustrates the distribution method in the case of discharge, where the priority order is set in an ascending order of the SOC. In (b) of FIG. 5, the SOC is low in the order of the unit 410, unit 420 and unit 430. Accordingly, PBCM1 which is a charge maximum output value is distributed to the unit 410 while a value obtained by subtracting PBCM1 from PBRx is distributed to the unit 420. Similarly as upon discharge, PBRx to the other units is zero.

As follows, operation where some unit cannot be used because of its pause time period being short is described with reference to FIG. 6.

Figure 6:
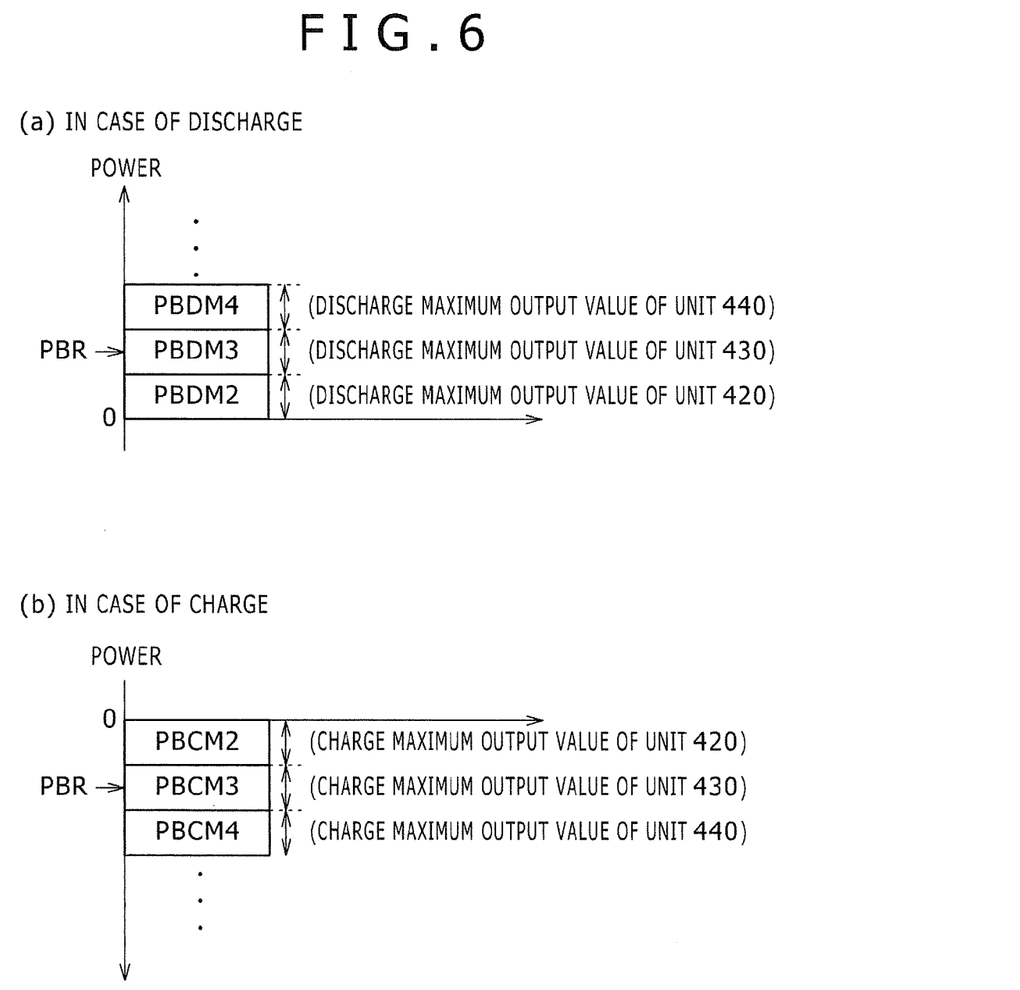
FIG. 6 illustrates another example of a distribution method of charge and discharge outputs, wherein (a) and (b) illustrate an example in the case of discharge, and charge, respectively.

(a) of FIG. 6 illustrates an example of discharge in a case in which the unit 410 cannot be used because the pause time period thereof is short. The unit 410 is determined unusable irrespective of the magnitude of the SOC, and the priority order of the units will be the unit 420, unit 430 and unit 440. Accordingly, PBRx to the unit 420 is PBDM2 while PBRx to the unit 430 has a value obtained by subtracting PBDM2 from PBR. PBRx to the other units and the unit 410 is zero. A method of carrying out non-usability decision depending upon the pause time period is hereinafter described.

Similarly, (b) of FIG. 6 illustrates an example of charge.

When the operation time of the unit 410 is short, the unit 410 is decided as unused, and the priority order of the units will be the unit 420, unit 430 and unit 440. Accordingly, PBRx to the unit 420 is PBCM2 while PBRx to the unit 430 has a value obtained by subtracting PBCM2 from PBR. PBRx of the other units and the unit 410 is zero.

Figure 7:
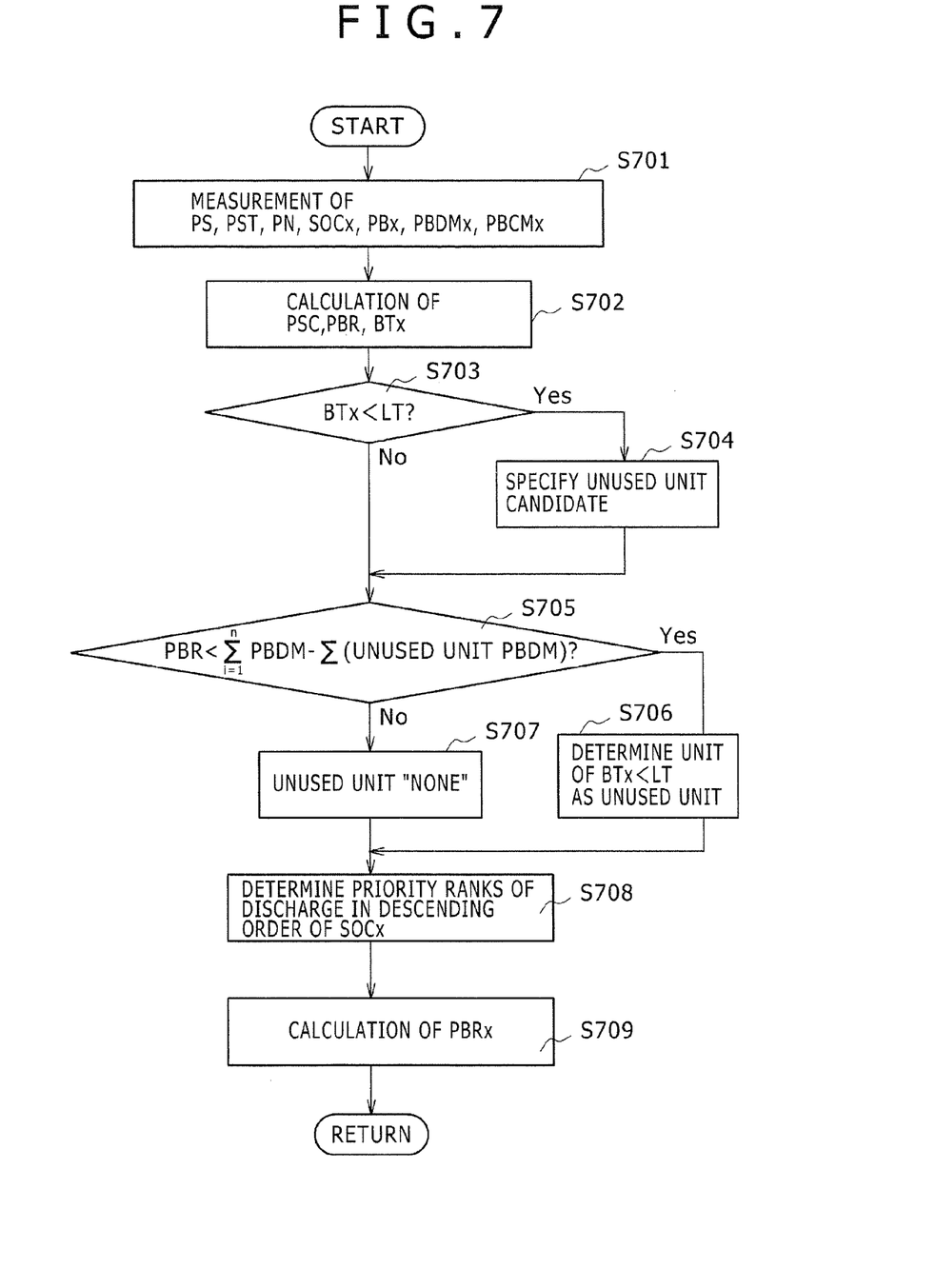
FIG. 7 illustrates an example of a flow chart in the embodiment of the present invention.

FIG. 7 illustrates an example of a flow chart when the assembled battery system 400 to which the present invention is applied discharges.

After starting (Start) of the system controller 500, at step S701, the system controller 500 measures the line power PS, line required power PST, output power PN of the natural energy power generation apparatus, state of charge SOCx of each unit, and charge and discharge power PBx and charge and discharge maximum output values PBCMx and PBDMx. Further, at step S702, the system controller 500 calculates an output correction value PSC for the assembled battery system, an output target value PBR for the system and a pause time period BTx for each unit. Then, at step S703, the system controller 500 compares the pause time period BTx and a predetermined value LT with each other. If LT is higher than BTx and the condition at step S703 is satisfied (YES at step S703), then the processing advances to step S704. At step S704, the units whose LT is higher than BTx are determined as candidates for an unused unit. If LT is not higher than BTx and the condition at step S703 is not satisfied (NO at step S703), or after the process at step S704 ends, the processing advances to step S705. At step S705, a value obtained by subtracting the sum of the discharge maximum output value PBDM of the units which have become the candidates for an unused unit from the total value of PBDM of all units is compared with the target charge and discharge power PBR. It is to be noted that if no unused unit is found, the total value of PBDM of the unused units is zero. If the condition at step S705 is satisfied, then this signifies that PBR can be distributed to the remaining units after the unused units are excepted. Therefore, at step S706, the units which have been the candidates for an unused unit are determined as unused units. If the condition at step S705 is not satisfied, this signifies that PBR cannot be distributed to all of the remaining units and the output is insufficient. Therefore, it is determined at step S707 that there is "no" unused unit, and the processing advances to step S708. At step S708, the priority order for discharge is determined in the descending order of SOCx. At step S709, a charge/discharge instruction value PBRx is calculated in accordance with the method described hereinabove and then distributed to the units. While the system controller is operating, the processes at the steps from step S701 to step S709 are executed repetitively. It is to be noted that a determination method of LT is hereinafter described.

Figure 8:
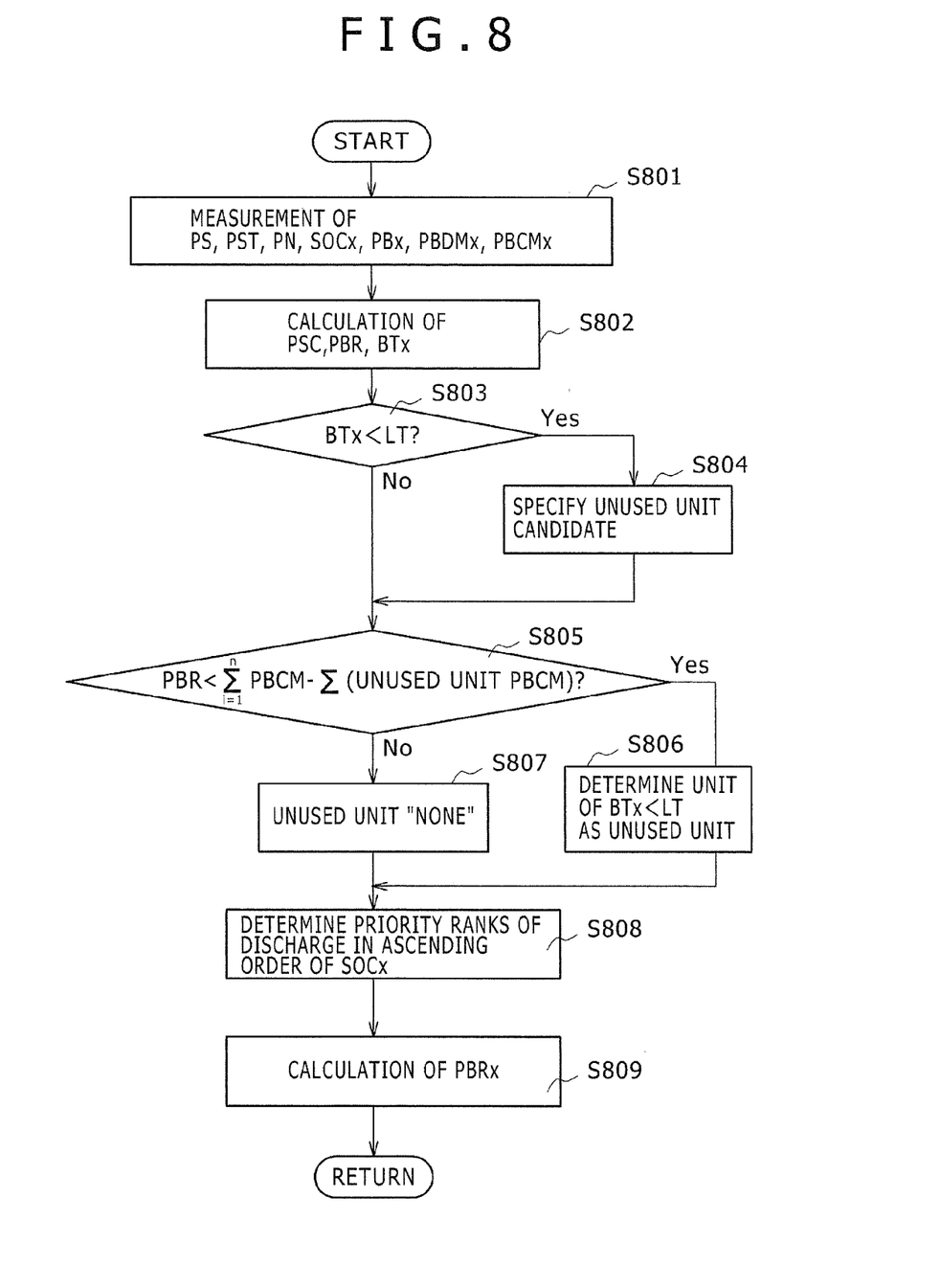
FIG. 8 illustrates another example of a flow chart in the embodiment of the present invention.

Similarly, FIG. 8 illustrates an example of a flow chart where the assembled battery system 400 to which the present invention is applied charges.

At step S801, the system controller 500 measures the line power PS, line required power PST, output power PN of the natural energy power generation apparatus 200, state of charge SOCx of each unit, charge and discharge power PBx and charge and discharge maximum output values PBCMx and PBDMx. Further at step S802, the system controller 500 calculates an output correction value PSC for the assembled battery system, natural charge and discharge power PBR of the system and pause time period BTx of each unit. Then at step S803, BTx and the predetermined value LT are compared with each other. If the condition at step S803 is satisfied, then the units which satisfy the condition are determined as candidates for an unused unit at step S804. If the condition at step S803 is not satisfied, or if the process at step S804 ends, then the processing advances to step S805. At step S805, a value obtained by subtracting the sum of PBCM of the units which have been determined as the candidates for an unused unit from the total value of PBCM of all units is compared with PBR. It is to be noted that, if no unused unit is found, then the total value of PBCM of the unused units is zero. If the condition at step S805 is satisfied, then this signifies that it is possible to distribute PBR to the remaining units after the unused unit or units are excepted. Therefore, at step S806, the units which have been the candidates for an unused unit are determined as unused units. If the condition at step S805 is not satisfied, then this signifies that PBR cannot be distributed to all of the remaining units and the output power is insufficient. Therefore, at step S806, it is determined that there is "no" unused unit, and the processing advances to step S808. At step S808, the priority order in discharge is determined in the ascending order of SOCx. Then at step S809, the instruction value PBRx is calculated in accordance with the method described hereinabove and distributed to the units. While the system controller 500 is operating, the processes at steps S801 to S809 are executed repetitively.

Figure 9:
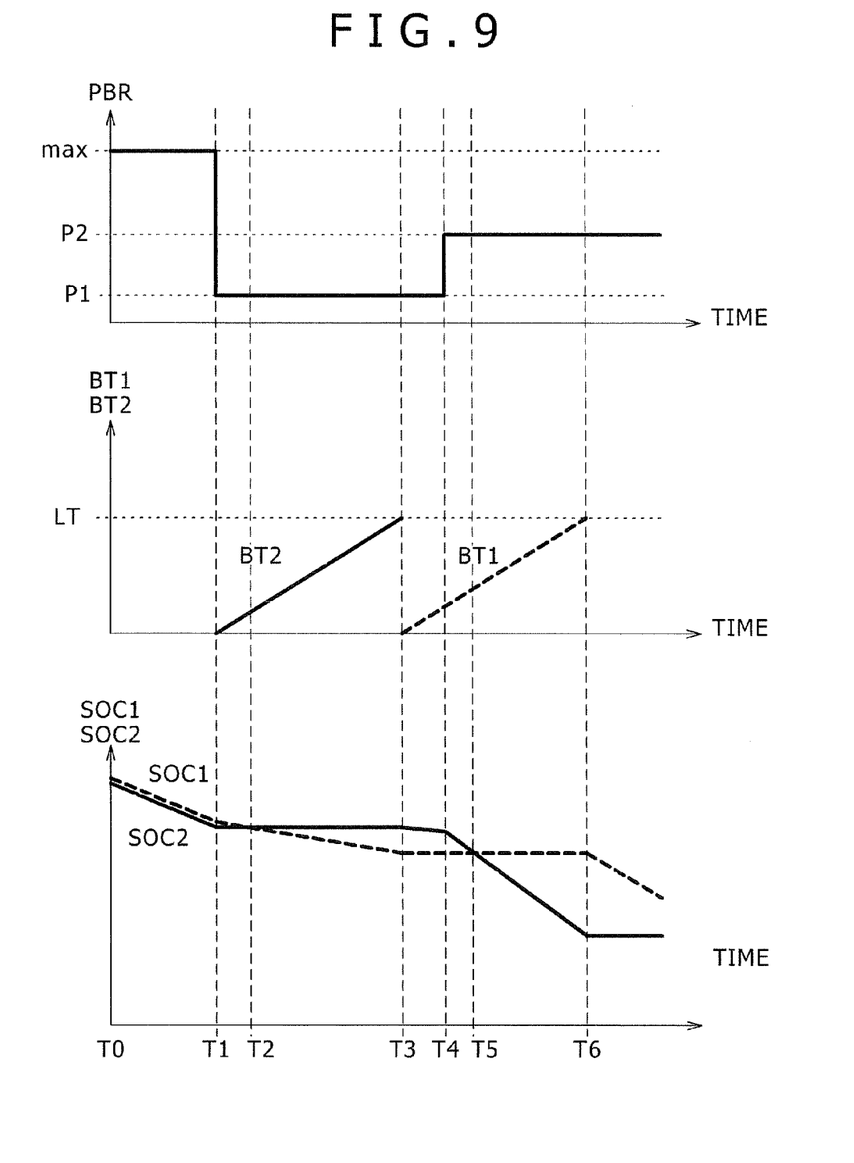
FIG. 9 illustrates an example of a time chart.

FIG. 9 is an example of a time chart when the flow chart of FIG. 7 is executed and the assembled battery system discharges.

For the simplification, a case in which the assembled battery system 400 includes two units (unit 1 and unit 2) is illustrated here. Further, it is assumed that, although the capacities of the two units are equal to each other, the state of charge SOC1 of the unit 1 is a little greater than that of the unit 2.

From certain time T0 to time T1, the graph shows a case when discharge is carried out at a maximum value of the target charge and discharge power PBR. After both the unit 1 and 2 discharge, the state of charge SOC drops as a result. PBR drops from the maximum value to P1 at T1, and when either of the units is able to provide sufficient output power, the discharge of the unit 2 which has smaller SOC stops discharging and the pause time period BT2 of the unit is integrated. Thereafter, only the unit 1 discharges, and at T2 the SOC values of the units become equal to each other. Although the SOC of the unit 1 is smaller than that of the unit 2 after T2, BT of the unit 2 does not reach the predetermined value LT as yet. Therefore, the discharge of the unit 1 continues till T3 at which BT2 reaches LT. After T3 the unit 2 discharges, and even if PBR changes to P2 during this, the discharge only of the unit 2 continues as long as the value remains within the range where it can be provided by the unit 2. Although the SOC values of the unit 1 and 2 are equal at T5, the discharge of the unit 2 continues till T6 at which BT1 of the unit 1 reaches LT.

A determination method of the predetermined value LT is described with reference to FIGS. 10 to 17.

Figure 10:
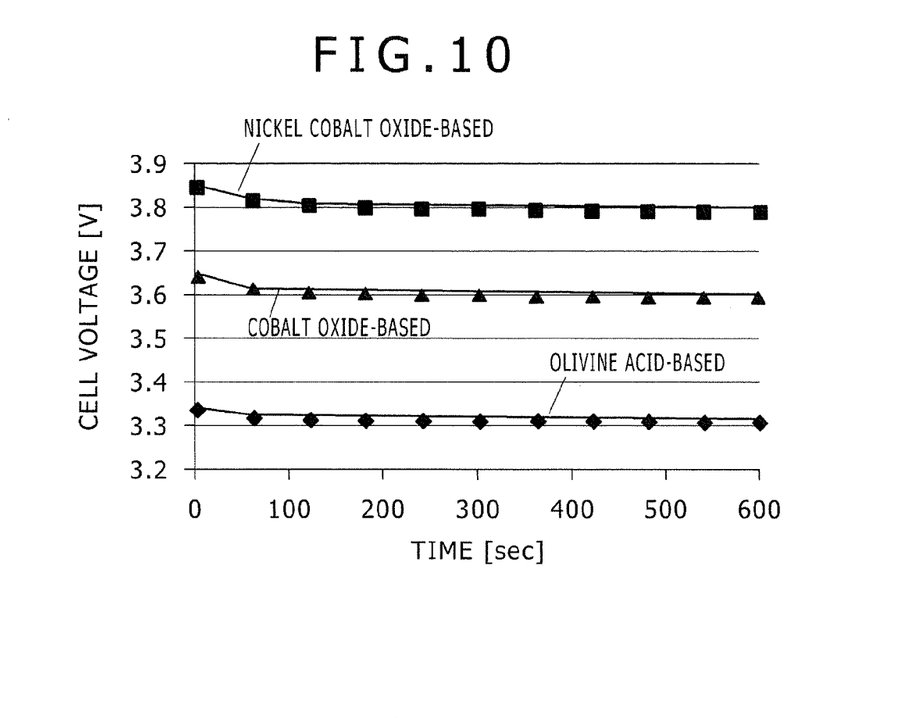
FIG. 10 illustrates an example of voltage profiles of lithium battery cells for a time period of 600 sec depending upon difference in material.
Figure 11:
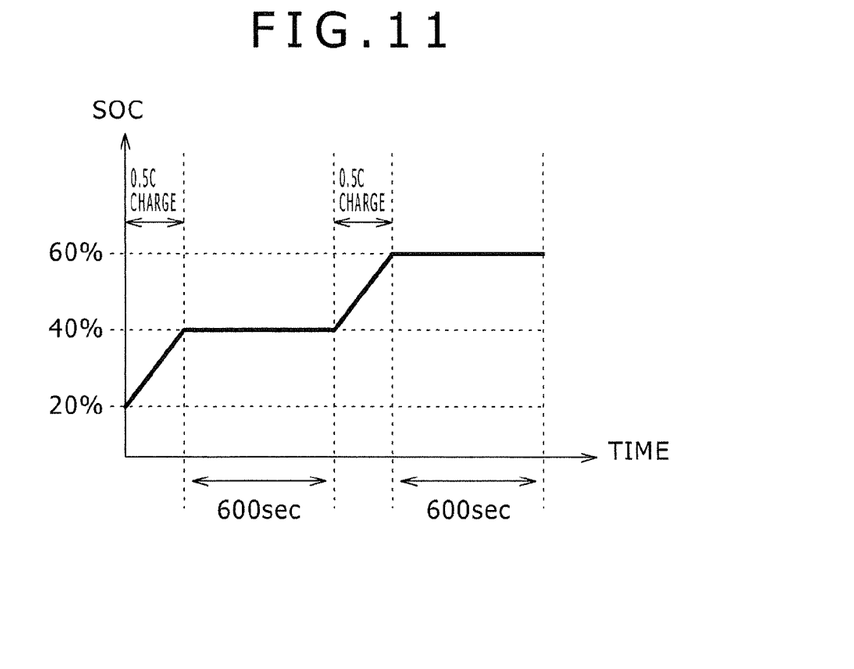
FIG. 11 illustrates an example of a measurement method of a cell voltage profile for a time period of 600 sec.

First, FIG. 10 illustrates a process of the cell voltage of lithium batteries (18650 type) produced by using olivine acid-based, lithium cobalt oxide-based and nickel cobalt acid lithium-based materials when the SOC is 40%. The materials mentioned are generally used for electrodes of lithium battery cells at present. The graph of FIG. 10 is a profile of the cells when, for all battery cells, the fixed current charge of 0.5 C of the SOC is carried out from 20% and the cells are left for 600 sec after the SOC reaches 40%. Time 0 sec represents time at which the charge is stopped. All cells indicate a great drop of the voltage immediately after the charge stops, and around time at which 600 sec elapse, little voltage variation is observed. This voltage drop is called polarization voltage and is caused principally by a factor that ions on the electrode surface of the lithium battery diffuse into the material by charge and discharge. If charge and discharge are carried out before ions diffuse sufficiently, then the ions are crystalized on the electrode surface and covers the electrode surface. Such coverage of the ions or reaction of the ions with the electrolyte degrades the state of the electrode surface thereby to degrade the performance of the lithium battery. Accordingly, the diffusion proceeds during a pause period after the charge stops, and it is desirable to set a pause time period until the variation of the voltage with respect to time becomes sufficiently small.

Figure 12:
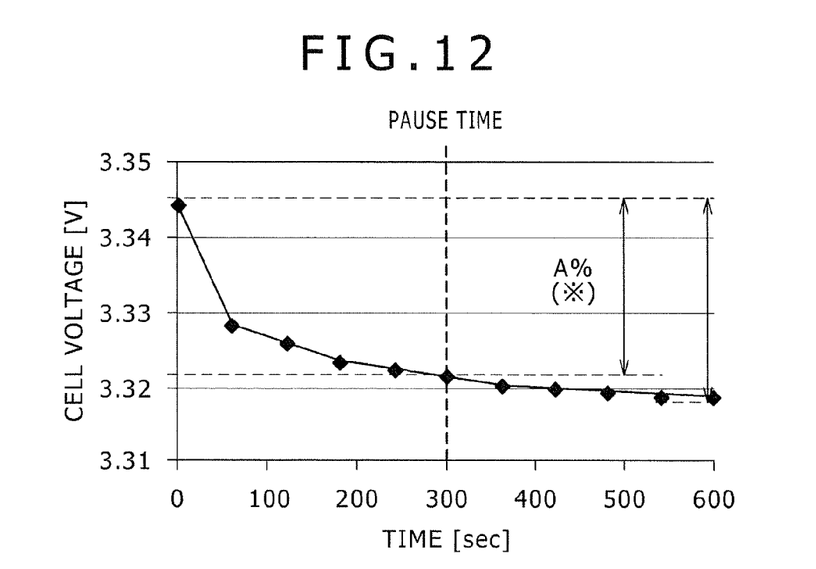
FIG. 12 illustrates an example of a determination method of a pause time period.

An example of the determination method of a pause time is illustrated in FIG. 12.

From the result of FIG. 10, as an example here, the voltage drop in 600 sec from a cell voltage immediately after the stop of charge (0 sec) is determined as a reference. Further, the period of time in which the cell voltage drops by A % from that immediately after the stop of charge (0 sec) is determined as pause time.

Figure 13:
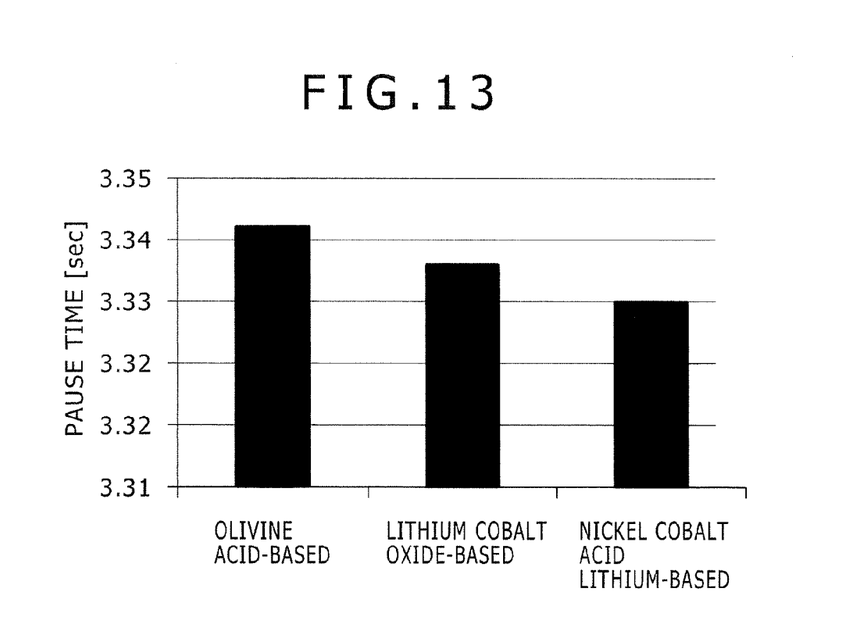
FIG. 13 illustrates a result of measurement of a pause time period for each material.

FIG. 13 illustrates a result of calculation of the pause time for each material with the cell voltage drop A=80% at each cell from the data of FIG. 10.

As a result, the calculated pause time is approximately 420 sec with regard to the olivine acid-based material, approximately 360 sec with regard to the lithium cobalt oxide-based and approximately 300 sec with regard to nickel cobalt acid lithium-based material. Thus, it is found that the pause time differs depending on materials.

Figure 14:
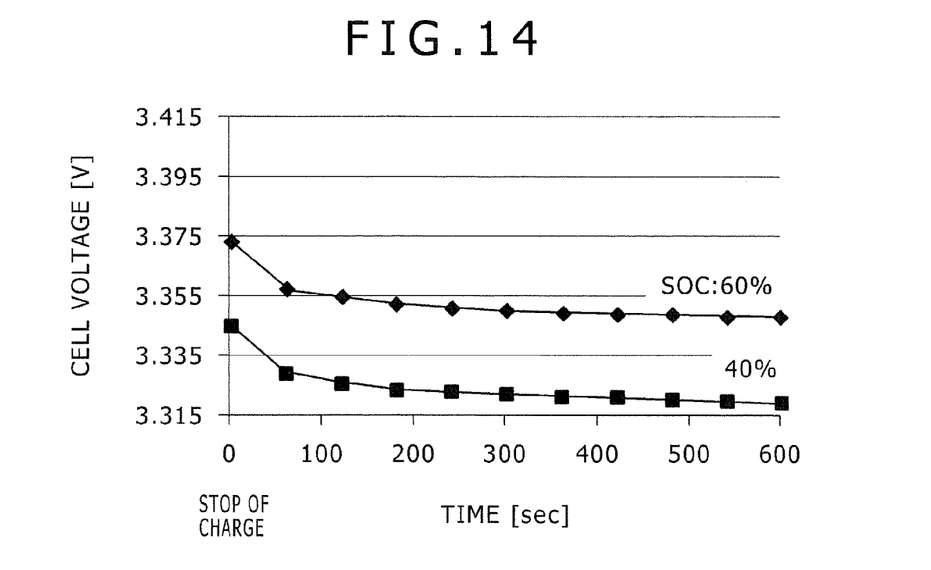
FIG. 14 illustrates a result of measurement of a cell voltage for 600 sec in an olivine acid-based lithium battery cell.
Figure 15:
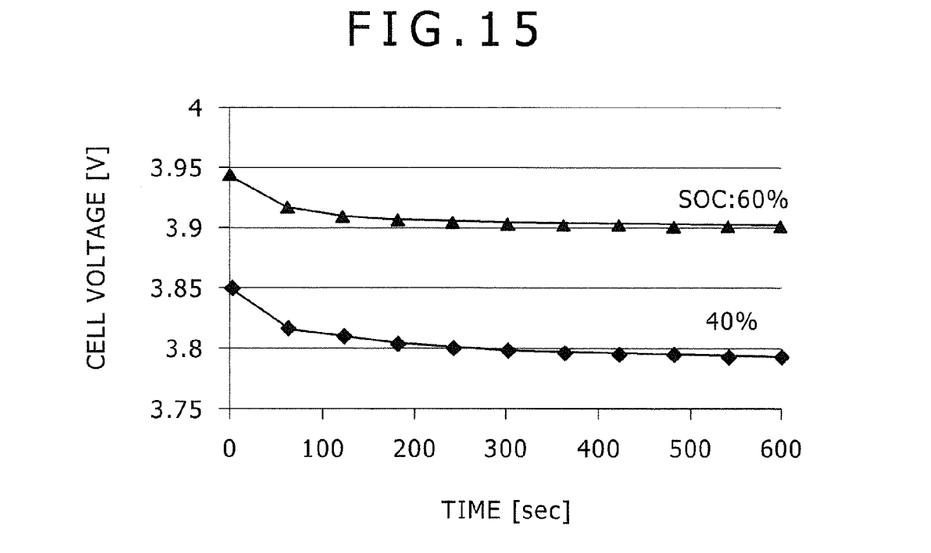
FIG. 15 illustrates a result of measurement of a cell voltage for 600 sec in a lithium cobalt oxide-based lithium battery cell.
Figure 16:
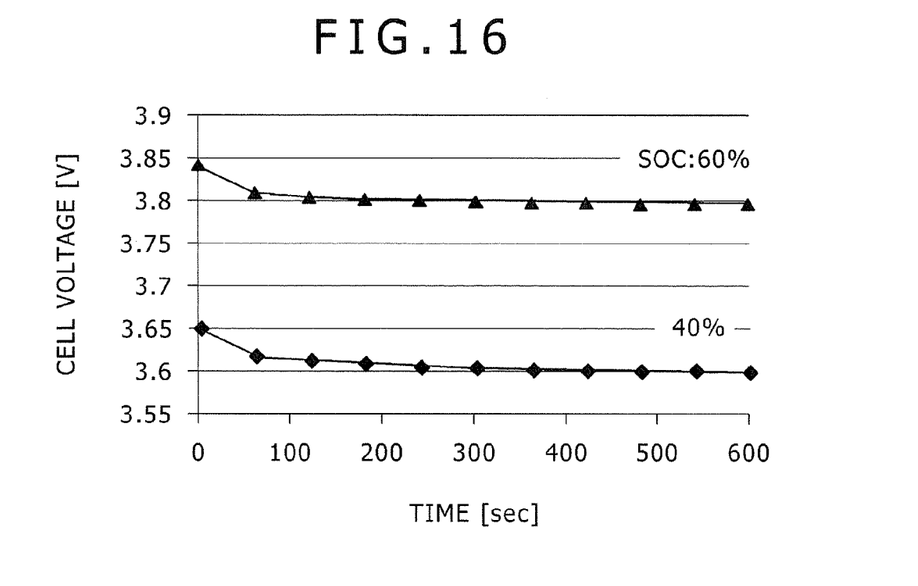
FIG. 16 illustrates a result of measurement of a cell voltage for 600 sec in a nickel cobalt acid lithium-based lithium battery cell.

Further, FIGS. 14 to 16 illustrate results on the profile of the cell voltage, measured at the SOC of 40% and the SOC of 60% in 600 sec from time immediately after the stop of charge, for the lithium battery cells of the olivine acid-based, lithium cobalt oxide-based, and nickel cobalt acid lithium-based materials.

In all the cases, a tendency is observed that the SOC of 60% has shorter time until the voltage variation becomes flat by approximately 60 sec.

Figure 17:
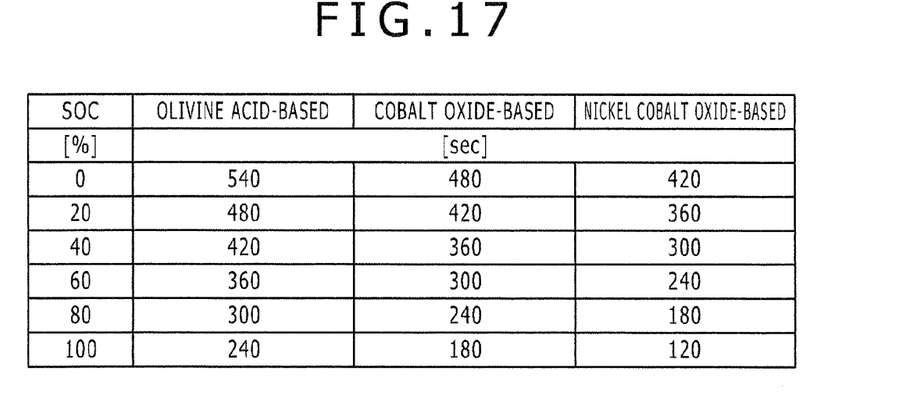
FIG. 17 illustrates an example of a set value of a pause time period for each SOC in olivine acid-based, lithium cobalt oxide-based and nickel cobalt acid lithium-based lithium battery cells.

Hence, FIG. 17 shows a pause time period from 0% to 100% of the SOC from the extrapolation of the pause time at the SOC of 40% and the SOC of 60% with the cell voltage drop A=80%.

As a result, it is desirable to provide a olivine acid-based lithium battery, a lithium cobalt oxide-based lithium battery, and a nickel cobalt acid lithium-based lithium battery with an approximate period of 240 to 540 sec, 180 to 480 sec, and 120 to 420 sec, respectively, as the predetermined value LT of the pause time period in response to the SOC.

Further, while the value of the cell voltage drop A is set to 80% to determine the pause time period in the present embodiment, the value A differs depending upon the use of battery or the required lifetime of battery. Therefore, when the cell voltage drop A is set to a low value, it is necessary to set the value of the predetermined value LT lower than the value of FIG. 7. When A is set to a high value, it is necessary to set the value of LT higher than the value of FIG. 7.

The invention claimed is:

1. A battery energy storage system which includes a function for controlling charge and discharge of power of a plurality of units, each unit including a capacitor and a power converter as one integrated unit, the plurality of units being electrically connected in parallel to each other,
    wherein, when said each unit performs the charge or the discharge by at least one or more times, the charge and the discharge of said each unit are controlled so as not to be performed until a predetermined pause time period elapses.

2. The battery energy storage system according to claim 1, wherein:
    upon discharge, said each unit to be used for discharge is selected and used in a descending order of the state of charges (SOCs) of the units; and
    upon charge, said each unit to be used for discharge is selected and used in an ascending order of the state of charges (SOCs) of the units.

3. The battery energy storage system according to claim 2, wherein:
    the predetermined pause time period is set in response to a material of a cell used for the capacitor which configures each unit so as to be 180 sec to 900 sec for an olivine acid-based material;
    120 sec to 840 sec for a lithium cobalt oxide-based material; and
    60 sec to 780 sec for a nickel cobalt acid lithium-based material.

4. The battery energy storage system according to claim 3, wherein the predetermined pause time period is set in response to the SOC of said each unit such that the predetermined pause time period reduces as the SOC increases.

5. The battery energy storage system according to claim 4, wherein, when the units include some unit in a pause and the power required for the battery energy storage system is higher than a total value of power capable of being outputted by the units except said some unit in a pause, charge and discharge of each unit are controlled irrespective of the predetermined pause time period.

6. The battery energy storage system according to claim 3, wherein, when the units include some unit in a pause and the power required for the battery energy storage system is higher than a total value of power capable of being outputted by the units except said some unit in a pause, charge and discharge of each unit are controlled irrespective of the predetermined pause time period.

7. The battery energy storage system according to claim 3, comprising:
    an output correction section configured to calculate a correction value for an output of the battery energy storage system from a difference between a power supplied to a line and a required power of the line;
    a target value calculation section configured to calculate a target output of the battery energy storage system based on the output of the output correction section, the required power of the line and a power supplied from a power generation apparatus;
    a pause time calculation section configured to calculate a pause time period of each unit based on an output value of the unit or a value for the target output; and
    a charge and discharge instruction value distribution section configured to determine distribution of a charge and discharge instruction value corresponding to each unit based on the calculated correction value of the output correction section, the calculated target output of the target value calculation section, SOC (state of charge) indicating a charge state of the unit and the calculated pause time period of the pause time calculation section.

8. The battery energy storage system according to claim 2, wherein the predetermined pause time period is set in response to the SOC of said each unit of the units such that the predetermined pause time period reduces as the SOC increases.

9. The battery energy storage system according to claim 8, wherein, when the units include some unit in a pause and the power required for the battery energy storage system is higher than a total value of power capable of being outputted by the units except said some unit in a pause, charge and discharge of each unit are controlled irrespective of the predetermined pause time period.

10. The battery energy storage system according to claim 2, wherein, when the units include some unit in a pause and the power required for the battery energy storage system is higher than a total value of power capable of being outputted by the units except some said unit in a pause, charge and discharge of each unit are controlled irrespective of the predetermined pause time period.

11. The battery energy storage system according to claim 2, comprising:
    an output correction section configured to calculate a correction value for an output of the battery energy storage system from a difference between a power supplied to a line and a required power of the line;
    a target value calculation section configured to calculate a target output of the battery energy storage system based on the output of the output correction section, the required power of the line and a power supplied from a power generation apparatus;
    a pause time calculation section configured to calculate a pause time period of each unit based on an output value of the unit or a value for the target output; and
    a charge and discharge instruction value distribution section configured to determine distribution of a charge and discharge instruction value corresponding to each unit based on the calculated correction value of the output correction section, the calculated target output of the target value calculation section, SOC (state of charge) indicating a charge state of the unit and the calculated pause time period of the pause time calculation section.

12. The battery energy storage system according to claim 1, wherein:
the predetermined pause time period is set in response to a material of a cell used for the capacitor which configures each unit so as to be 180 sec to 900 sec for an olivine acid-based material;
120 sec to 840 sec for a lithium cobalt oxide-based material; and
60 sec to 780 sec for a nickel cobalt acid lithium-based material.

13. The battery energy storage system according to claim 12, wherein the predetermined pause time period is set in response to the state of charge (SOC) of said each unit of the units such that the predetermined pause time period reduces as the SOC increases.

14. The battery energy storage system according to claim 13, wherein, when the units include some unit in a pause and the power required for the battery energy storage system is higher than a total value of power capable of being outputted by the units except said some unit in a pause, charge and discharge of each unit are controlled irrespective of the predetermined pause time period.

15. The battery energy storage system according to claim 12, wherein, when the units include some unit in a pause and the power required for the battery energy storage system is higher than a total value of power capable of being outputted by the units except some said unit in a pause, charge and discharge of each unit are controlled irrespective of the predetermined pause time period.

16. The battery energy storage system according to claim 12, comprising:
an output correction section configured to calculate a correction value for an output of the battery energy storage system from a difference between a power supplied to a line and a required power of the line;
a target value calculation section configured to calculate a target output of the battery energy storage system based on the output of the output correction section, the required power of the line and a power supplied from a power generation apparatus;
a pause time calculation section configured to calculate a pause time period of each unit based on an output value of the unit or a value for the target output; and
a charge and discharge instruction value distribution section configured to determine distribution of a charge and discharge instruction value corresponding to each unit based on the calculated correction value of the output correction section, the calculated target output of the target value calculation section, SOC (state of charge) indicating a charge state of the unit and the calculated pause time period of the pause time calculation section.

17. The battery energy storage system according to claim 1, wherein the predetermined pause time period is set in response to a state of charge (SOC) of said each unit of the units such that the predetermined pause time period reduces as the SOC increases.

18. The battery energy storage system according to claim 17, when the units include some unit in a pause and the power required for the battery energy storage system is higher than a total value of power capable of being outputted by the units except said some unit in a pause, charge and discharge of each unit are controlled irrespective of the predetermined pause time period.

19. The battery energy storage system according to claim 1, wherein, when the units include some unit in a pause and a power required for the battery energy storage system is higher than a total value of power capable of being outputted by the units except said some unit in a pause, charge and discharge of each unit are controlled irrespective of the predetermined pause time period.

20. The battery energy storage system according to claim 1, comprising:
an output correction section configured to calculate a correction value for an output of the battery energy storage system from a difference between a power supplied to a line and a required power of the line;
a target value calculation section configured to calculate a target output of the battery energy storage system based on the output of the output correction section, the required power of the line and a power supplied from a power generation apparatus;
a pause time calculation section configured to calculate a pause time period of each unit based on an output value of the unit or a value for the target output; and
a charge and discharge instruction value distribution section configured to determine distribution of a charge and discharge instruction value corresponding to each unit based on the calculated correction value of the output correction section, the calculated target output of the target value calculation section, SOC (state of charge) indicating a charge state of the unit and the calculated pause time period of the pause time calculation section.

* * * * *